United States Patent [19]
Verdier

[11] Patent Number: 5,180,548
[45] Date of Patent: Jan. 19, 1993

[54] GRID HAVING MIXING FINS FOR A NUCLEAR FUEL ASSEMBLY

[75] Inventor: Michel Verdier, Villeurbanne, France

[73] Assignees: Framatome, Courbevoie; Compagnie Generale Des Matieres Nucleaires, Villacoublay, both of France

[21] Appl. No.: 735,246

[22] Filed: Jul. 24, 1991

[30] Foreign Application Priority Data

Jul. 24, 1990 [FR] France .................. 90 09446

[51] Int. Cl.⁵ ........................... G21C 3/34
[52] U.S. Cl. ................. 376/439; 376/443; 376/454; 376/438; 376/462
[58] Field of Search .......... 376/439, 443, 454, 438, 376/462, 442, 440; 976/DIG. 79, DIG. 80, DIG. 81

[56] References Cited

U.S. PATENT DOCUMENTS

| | | | |
|---|---|---|---|
| 3,852,154 | 12/1974 | Carlson et al. | 376/442 |
| 3,933,584 | 1/1976 | Litt | 176/78 |
| 4,039,379 | 8/1977 | Patterson et al. | 376/439 |
| 4,726,926 | 2/1988 | Patterson et al. | 376/439 |
| 4,728,490 | 3/1988 | Taleyarkhan | 376/439 |
| 4,758,403 | 7/1988 | Noailly | 376/439 |
| 4,804,516 | 2/1989 | Thomazet et al. | 376/439 |
| 4,844,861 | 7/1989 | LeClercq | 376/439 |

FOREIGN PATENT DOCUMENTS 0148452 7/1985 European Pat. Off. .
0378094 7/1990 European Pat. Off. .
2457544 12/1980 France .

Primary Examiner—Donald P. Walsh
Assistant Examiner—Neena Chelliah
Attorney, Agent, or Firm—Pollock, Vande Sande & Priddy

[57] ABSTRACT

A mixing grid for use in a pressurized reactor comprises at least two sets of crossed fixed together at their crosspoints, delimiting cells, some for receiving fuel rods and the others for receiving guide tubes, the plates being provided with coolant stirring fins extending the plates downstream and disposed to deflect the coolant transversely to its general flow direction, each plate being provided with abutment means projecting inwardly from each of the faces of the cells for receiving fuel rods, thereby delimiting a passage that is larger than the size of the rods but small enough to prevent a rod contained in the cell coming into contact with the fins. In each wall the abutment means comprise two portions of plate that are cut out and deformed into a scoop-shape, and that are offset relative to each other in the coolant flow direction, with the scoops projecting in opposite directions and tending to cause coolant to pass from one cell to another.

10 Claims, 3 Drawing Sheets

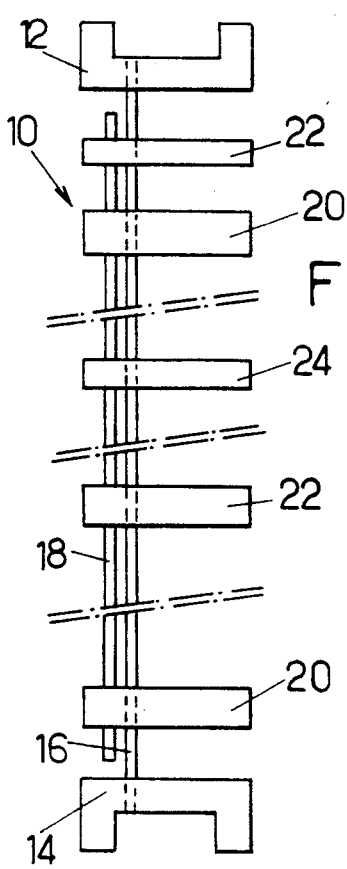
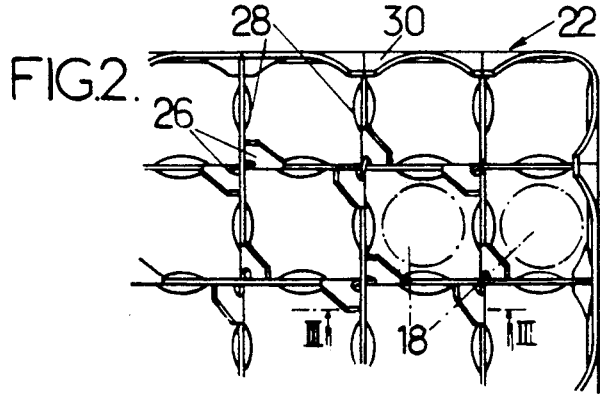
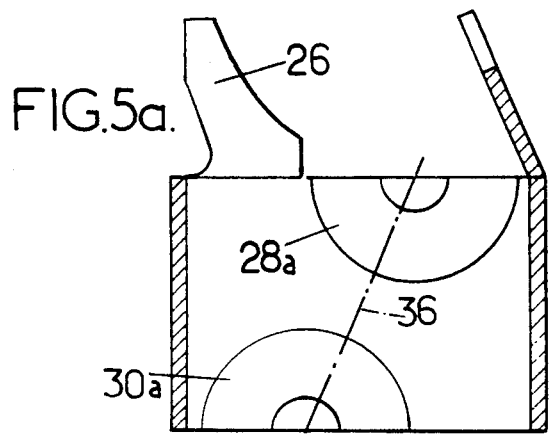
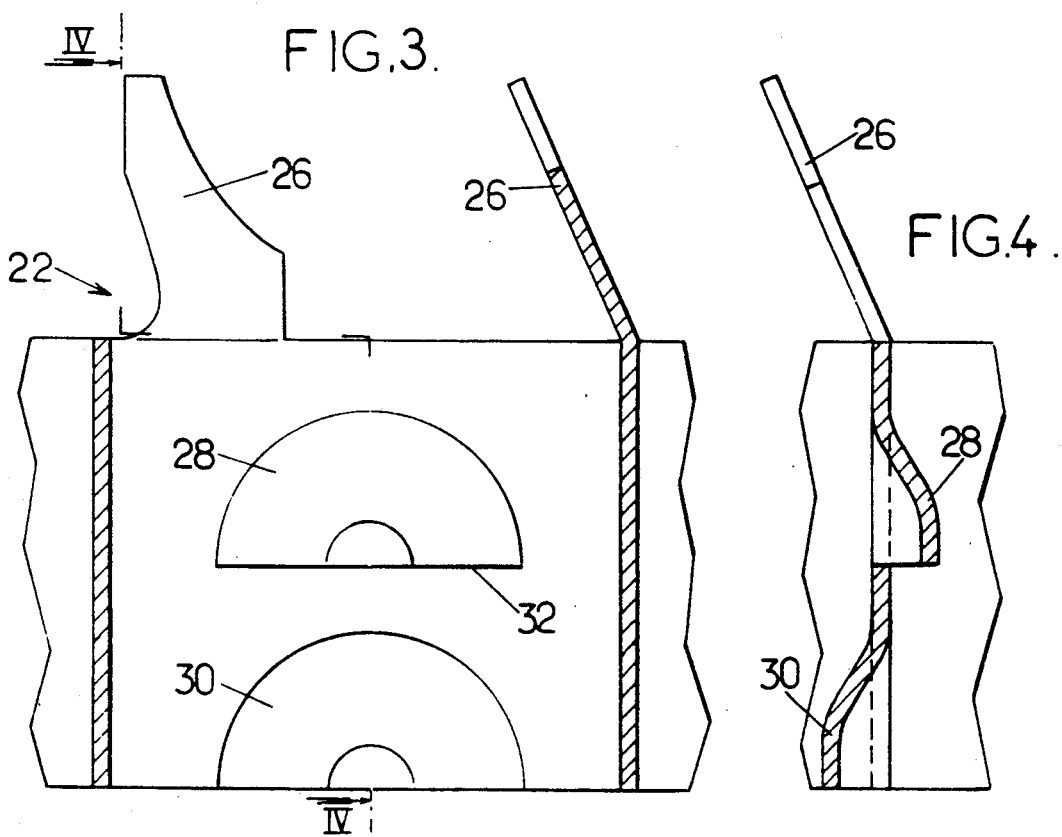

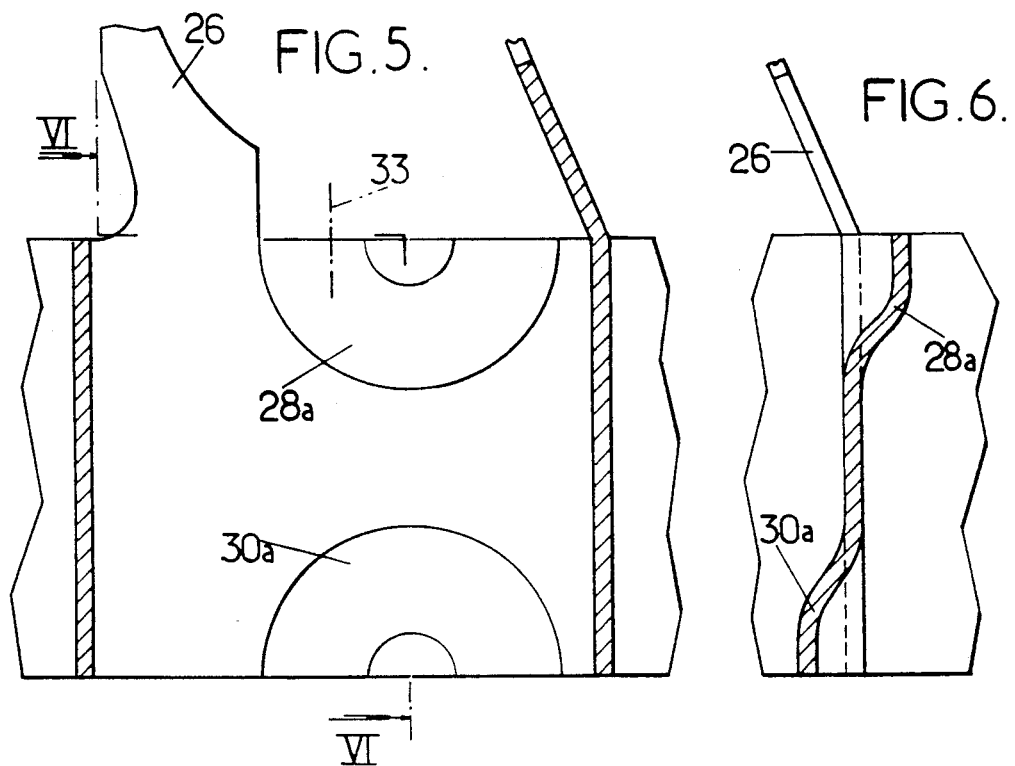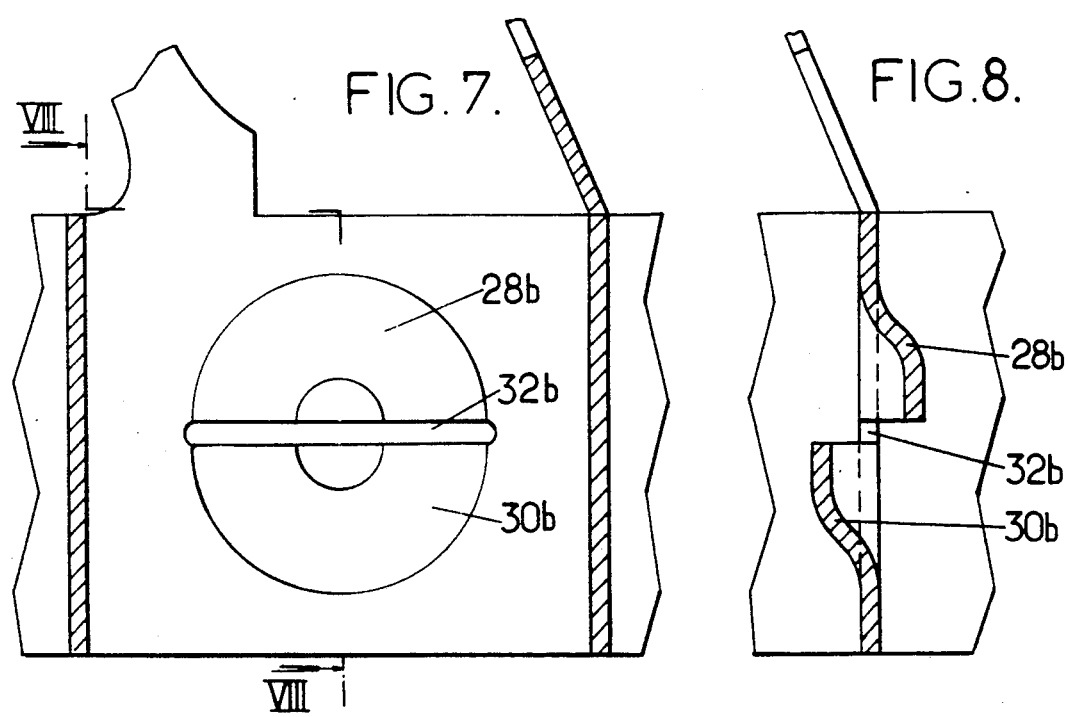

GRID HAVING MIXING FINS FOR A NUCLEAR FUEL ASSEMBLY

FIELD OF THE INVENTION

The present invention relates to a grid having mixing fins for a nuclear fuel assembly, the grid having the particular function of improving the mixing of streams of coolant flowing upwards through the assembly and of making the temperature within the assembly more uniform.

BACKGROUND OF THE INVENTION

The invention relates more particularly to mixing grids of the type comprising at least two sets of crossed plates fixed together at their crossover points, delimiting cells some of which are for receiving fuel rods and the other are for receiving guide tubes, the grids being provided with coolant-stirring fins extending the plates downstream and disposed to deflect the coolant transversely to its general flow direction, each plate being provided with abutment means projecting inwards from each of the faces of the cells for receiving fuel rods.

The invention is particularly applicable to fuel assemblies in which the support structure includes guide tubes interconnected two end fittings and, in addition to mixing grids of the above kind that do not participate in supporting the rods (i.e. to supporting them vertically), at least one additional grid for carrying the rods. For this purpose, the grid is provided with springs cut out from the plates or fixed to the plates and designed to urge the rods against abutment means constituted by bosses situated opposite.

Development in reactor characteristics, in particular towards higher thermohydraulic performance and combustion rates gives rise to the use of grids other than supporting grids having abutment means delimiting passages that are larger in size than the rods, thereby facilitating coolant flow and avoiding damage to the rod sheaths during insertion. This clearance is small enough to limit rod vibration to an amplitude smaller than that which could give rise to the sheath being damaged and to the stirring fins being hammered by the rods.

The present invention seeks in particular to provide a grid of the above type in which the abutment means participate in making the temperature within an assembly more uniform, without giving rise to excessive headloss.

SUMMARY OF THE INVENTION

To this end, the present invention provides a mixing grid in which the abutment means comprise, in each wall separating two internal cells occupied by fuel rods, two portions of plate that are cut out and deformed into a scoop-shape, and that are offset relative to each other in the coolant flow direction, with the scoops projecting in opposite directions and tending to cause coolant to pass from one cell to another. The term "internal" designates a cell surrounded on all of its sides by plates, consequently it applies to all of the cells of a belted grid, but it excludes the outermost cells of a grid that does not have a belt.

Such a structure can be used both for structural grids that provide mechanical strength to the assembly as a whole and are provided with an outer belt that may possibly extend further in the flow direction than the other plates, and also for grids hat have a thermodynamic function only and do not have a belt.

The scoop-shaped abutment means are constituted by deforming approximately semicircular zones of the plates, opening either to an edge of the plate or else to a slot formed through the plate transversely to the flow direction. The two scoops may be in the general form of half a truncated cone. The scoops offset in the coolant flow direction may occupy a fraction only of the width of the plate (i.e., they may optionally extend up the entire height of the grid).

In an advantageous embodiment, each of the fins engages only one of the cells in the grid (i.e., extends to one side only of the line of intersection with another plate), and each plate includes no more than one half-fin at each cell corner. It may then be advantageous either to place the scoops on a line parallel to the general flow direction through the assembly but offset from the middle of the cell wall, or else to dispose them on a line that slopes relative to the general flow direction. For example, the fins may be disposed as described in French Pat. No. 84 16803 (published under No. 2 572 837).

BRIEF DESCRIPTION OF THE DRAWINGS

Embodiments of the invention are described by way of example with reference to the accompanying drawings, in which:

FIG. 1 is a schematic elevation view showing how grids are distributed in a fuel assembly for a pressurized water reactor;

FIG. 2 is a schematic plan view of a corner fragment of a structural grid constituting a particular embodiment of the invention;

FIG. 3 is a large scale section view of the FIG. 2 grid on line III—III;

FIG. 4 is a section view on line IV—IV of FIG. 3;

FIGS. 5 and 6 are similar to FIGS. 3 and 4 and show a different embodiment of a structural grid that limits rod clearance;

FIG. 5a is similar to FIG. 5 and shows a variant thereof;

FIGS. 7 and 8 are similar to FIGS. 3 and 4 and show yet another embodiment;

DETAILED DESCRIPTION

Figure 9:
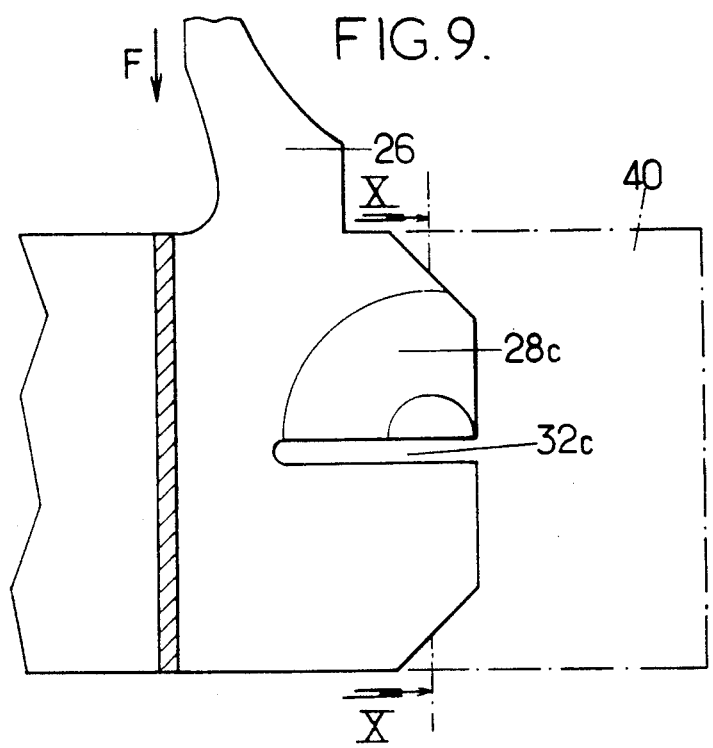
FIG. 9 is a large scale section view on a plane parallel to the wall of a cell, showing a structure in accordance with the invention for the terminal portion of a plate belonging to a mixing grid that does not have a belt, and constituting a particular embodiment of the invention.

FIG. 1 shows an assembly in which grids of the invention can be used. This assembly 10 comprises a support structure having two end fittings or endpieces 12 and 14 interconnected by guide tubes 16 for receiving the rods of a control cluster (not shown). The assembly also includes fuel rods 18, of which only one is shown. These rods 18 are held at the nodes of a regular array and are supported by grids. At least one of the grids holds the rods 18 longitudinally. This grid may be, in particular, the bottom grid 20 fixed to the guide tubes and provided for this purpose with springs that urge the rods against bosses, which springs may be cut out from the plates constituting the grid 20 or may be fixed thereto.

The other grids may include firstly zirconium-based alloy grids 22 including respective belts and providing mechanical strength to the assembly, secondly grids 24 having only a thermohydraulic function of stirring and mixing the coolant, and thirdly a structural grid 20 which holds the fuel rods but which is itself free relative to the guide tubes. The grids 24 are often shorter than the grids 22 and/or not provided with a belt. The stirring grids 24 generally alternate with structural grids 22 in the downstream portion of the assembly 10, i.e., in the top portion thereof.

For an assembly in which the fuel rods 18 are distributed at the nodes of a square array, each grid 22 may have the general structure shown in FIG. 2. Such a grid is made up of two crossed sets of plates assembled to half-depth and welded together at their cross-points. The grids 22, or at least those of the grids that are furthest downstream in the flow direction, are provided with fins 26 for generating turbulence or transverse flows. Each of these fins 26 is advantageously made in such a manner as to engage only one cell in the grid, as shown in FIG. 2 or in the above-mentioned French patent. For example, each plate may be provided with fins 26 that all slope to the same side, and that are distributed at intervals along a plate equal to twice the size of a cell, each extending from a cross-point towards the middle of the wall of the associated cell.

The belt 28 is generally made up of four external plates that are assembled together and provided with sloping tongues 30 and rounded corners to avoid catching between the grids of two adjacent assemblies when an assembly is being installed.

In accordance with the invention, the internal cells for receiving respective rods 18 include inwardly-projecting abutment means on their four faces, the abutment means delimiting a passage which is larger than the dimensions of a rod. On each face separating two internal cells of this type, these abutment means are constituted by two scoop-shaped portions that are cut out and stamped. In the particular case shown in FIGS. 3 and 4, the abutment means formed in a portion of plate constituting the wall between two cells are constituted by two portions 28 and 30 shaped like half-buttons on a base that is approximately semicircular, and they are in alignment in the coolant flow direction, while projecting in opposite directions. The two scoops are of the same size. Their semicircular bases point downstream. The downstream scoop 28 is delimited by a slot 32 cut out in the plate. The upstream scoop 30 terminates in a deformed portion of the upstream edge of the plate. As can be seen in FIG. 4, the downstream scoop 28 projects in the direction opposite to the slope direction of the fin 26 carried on the same wall.

The embodiment shown in FIGS. 5 and 6 differs from the preceding embodiment as follows:

The downstream scoop 28a opens in the direction opposite to the upstream scoop 30a and extends to the downstream edge of the plate, which plate is consequently not slotted; and the scoops 28a and 30a are offset relative to the center line 33 of the wall so as to prevent the scoop 28a from interfering with the fin 26.

As before, the downstream scoop 28a projects in the direction opposite to the fin 26.

In the variant embodiment shown in FIG. 5a, the scoops 28a and 30a are identical to those of FIG. 5, but they are aligned in a direction 36 which slopes relative to the general flow direction.

In the embodiment shown in FIGS. 7 and 8, the scoops 28b and 30b are disposed head-to-tail in the direction opposite to the scoops shown in FIGS. 5 and 6. Their open ends face each other. They are separated by a slot 32b which is generally wider than the slot shown in FIG. 3.

Instead of being orthogonal to the general flow direction, the slot 32b could slope relative thereto in order to put the scoops in a relative disposition comparable to that of FIG. 5a.

As mentioned above, the invention is also applicable to grids having a thermohydraulic stirring function only, and not having a belt. Under such circumstances, the outermost cells may be provided with abutment means in the form of fractions of a scoop only.

Figure 11:
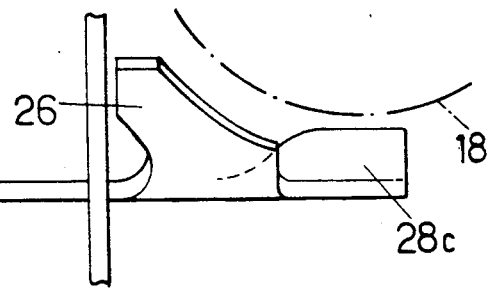

FIGS. 9 and 11 show one possible structure for abutment means suitable for use on a grid 24 that has a thermohydraulic function only and does not have a belt, with its plates projecting beyond the last plate that they cross, and projecting over a length that is less than the normal size 40 for the wall of an internal cell. This plate shortening has the advantage of preventing any catching between the thermohydraulic grids of two adjacent assemblies since the plane "footprint" of the grid is smaller than the envelope of the rods 18.

Figure 10:
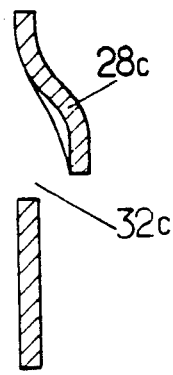
FIGS. 10 and 11 are respectively a section view on line X—X of FIG. 9 and a view in the direction F.

In the embodiment of FIGS. 9 to 11, the terminal portion includes a single partial scoop 28c having the same disposition as the scoop 28b of FIGS. 7 and 8 but offset therefrom and truncated by the shortening of the plate. This scoop points in the same direction as the fin 26 so as to prevent the rod 18 from coming into contact with the fin. It would also be possible to provide a second partial scoop, similar to the scoop 30b of FIGS. 7 and 8 and separated from the scoop 28c by the slot 32c. However, in most cases there is no need for a scoop that points in the direction opposite to the fin.

Figure 12:
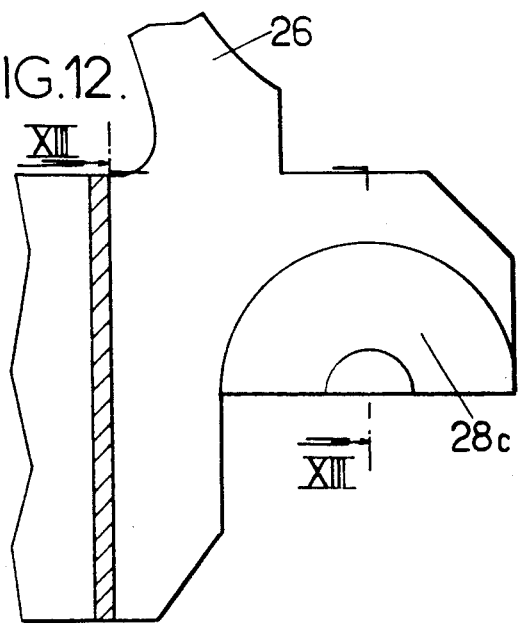
FIGS. 12 and 13 are similar to FIGS. 9 and 10 and show a variant embodiment.
Figure 13:
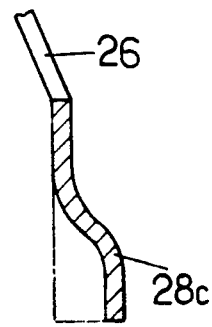

The embodiment shown in FIGS. 12 and 13 differs from the preceding embodiment in that the entire terminal portion of each plate situated beneath the slot 32c is eliminated. In contrast, the plate is a little longer than the plate shown in FIG. 9, so that the scoop 28d constitutes a complete half-button.

By way of example, it may be mentioned that the scoops may project by about 1.1 mm to about 1.2 mm having a base diameter of about 7 mm in a grid that provides a thermohydraulic function only, and a height of 10 mm. The scoop may be in the form of a truncated circular cone terminated by a flat having a diameter of 1.5 mm to 2 mm.

I claim:

1. A mixing grid for a nuclear fuel assembly, the grid comprising at least two sets of crossed plates fixed together at their cross-points and defining cells distributed in a regular array, some for receiving fuel rods and the others for receiving guide tubes, the plates being provided with coolant stirring fins extending the plates downstream and disposed to deflect the coolant transversely to its general flow direction, each plate being provided with abutment means projecting inwardly from each of the sides of those cells which are to receive fuel rods, thereby defining a passage that is larger than the size of the rods but small enough to prevent a rod contained in the cell coming into contact with the fins, wherein said abutment means comprise, in each plate separating two cells other than peripheral which receives a rod, two portions of said plate that are cut out and deformed into two scoops, and that are mutually offset in the coolant flow direction, said scoops projecting in mutually opposite directions and tending to cause coolant to pass from one cell to another across said plate.

2. A grid according to claim 1, wherein the scoops are formed by pressing out zones of the plates which are approximately semicircular and open either to an edge of the plate or to a slot formed in the plate transversely to the flow direction.

3. A grid according to claim 2, wherein the scoops are in the shape of truncated cone halves.

4. A grid according to claim 1, wherein two said mutually offset scoops occupy a fraction only on the width of the respective plate.

5. A grid according to claim 1, wherein the two mutually offset scoops have respective semicircular bases on their downstream sides and wherein the dowstream scoop is defined by a slot cut out in the plate while the upstream scoop is terminated by a deformed portion of the upstream edge of the plate, the downstream scoop projecting in a direction with respect to the plate which is opposite to the direction into which a fin carried by the same wall of the cell is sloped.

6. A grid according to claim 1, wherein the downstream scoop of said mutually offset scoops opens in the direction opposite to that of the upstream scoop and extends up to the downstream edge of the plate, the downstream scoop projecting from the plate in the direction opposite to the direction into which a fin carried by the same wall of the cell is sloped.

7. A grid according to claim 1, devoid of peripheral belt, wherein the plates are of such a length that they have an envelope smaller than the envelope of the fuel cells in the assembly, and wherein the walls separating the outermost cells include abutment means projecting from that side of the plate towards which a fin of the respective cell is sloped.

8. A nuclear fuel assembly having a bundle of mutually parallel fuel elements and a support structure including guide tubes and a plurality of grids, wherein each one of only some of said grids comprise at least two sets of crossed plates fixed together at their crosspoints and defining cells distributed in a regular array, some for receiving fuel rods and the others for receiving guide tubes, the plates being provided with coolant stirring fins extending the plates downstream and disposed to deflect the coolant transversely to its general flow direction, each plate being provided with abutment means projecting inwardly from each of the sides of those cells which are to receive fuel rods, thereby defining a passage that is larger than the size of the rods but small enough to prevent a rod contained in the cell coming into contact with the fins, wherein said abutment means comprise, in each plate separating two cells other than peripheral which receives a rod, two portions of said plate that are cut out and deformed into two scoops, and that are mutually offset in the coolant flow direction, said scoops projecting in mutually opposite directions and tending to cause coolant to pass from one cell to another across said plate.

9. A mixing grid for a nuclear fuel assembly, said mixing grid comprising two sets of crossed plates fixed together at their cross-points and defining cells distributed in a regular array, some of said cells for receiving fuel rods and the others for receiving guide tubes, wherein said plates are formed with coolant mixing fins extending the plates on their downstream side and angularly disposed with respect to said plates to deflect coolant transversely to its general flow direction along the fuel rods; wherein each of said plates further comprises abutment means projecting inwardly from each of the sides of those cells which are to receive fuel rods by such amounts that they define in each said cell a passage that is larger than the size of the rod but small enough to prevent the rod contained in the cell from coming into contact with the respective fins; and wherein said abutment means comprise, in each portion of one of said plates which separates two cells which each receives one fuel rod, except peripheral cells, two cut out portions of said plate mutually offset in the coolant flow direction, projecting in mutually opposite directions and forming scoops having mutually confronting openings separated by a slot formed in the plate transversely to the general coolant flow direction.

10. A mixing grid according to claim 9, wherein each of said scoops merges with a current portion of the respective plate along a semi-circular line.

* * * * *